US010451523B2

(12) United States Patent
Ejakov (10) Patent No.: US 10,451,523 B2
(45) Date of Patent: Oct. 22, 2019

(54) MISFIRE DETECTION WITH CRANKSHAFT VIBRATIONS (71) Applicant: Ford Global Technologies, LLC, Dearborn, MI (US)

(72) Inventor: Mikhail Ejakov, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 760 days.

(21) Appl. No.: 14/549,252

(22) Filed: Nov. 20, 2014

(65) Prior Publication Data
US 2016/0146704 A1 May 26, 2016

(51) Int. Cl.
*G01M 15/11* (2006.01)
*F02D 41/14* (2006.01)
*G01M 15/12* (2006.01)

(52) U.S. Cl.
CPC ........ *G01M 15/11* (2013.01); *F02D 41/1497* (2013.01); *G01M 15/12* (2013.01); *F02D 2200/1015* (2013.01); *F02D 2250/14* (2013.01)

(58) Field of Classification Search
CPC ........ F02D 2200/1015; F02D 2250/14; F02D 41/1497; F02D 41/1498; G01M 15/11; G01M 15/12
USPC ............ 701/111; 73/114.04, 114.25, 114.26; 123/435–436
See application file for complete search history.

(56) References Cited

U.S. PATENT DOCUMENTS

| 4,977,508 | A | * | 12/1990 | Tanaka | F02B 75/06 123/192.1 |
|---|---|---|---|---|---|
| 5,200,899 | A | | 4/1993 | Ribbens et al. | |
| 5,400,644 | A | * | 3/1995 | Remboski, Jr. | G01L 23/225 701/111 |
| 5,508,927 | A | * | 4/1996 | Remboski, Jr. | G01M 15/11 701/101 |
| 5,632,247 | A | * | 5/1997 | Hashizume | G01L 23/225 123/406.26 |
| 5,633,456 | A | | 5/1997 | Stander | |
| 5,915,359 | A | * | 6/1999 | Meyer | F02D 41/1405 123/436 |
| 6,131,444 | A | * | 10/2000 | Wu | F02D 41/1405 73/114.02 |
| 6,456,927 | B1 | * | 9/2002 | Frankowski | G01L 23/225 123/406.21 |
| 7,676,323 | B2 | * | 3/2010 | Kearney | G01L 23/225 701/111 |
| 8,478,511 | B2 | * | 7/2013 | Hamama | F02D 41/0025 123/1 A |
| 8,676,471 | B2 | * | 3/2014 | Catanese | F02D 35/023 123/435 |
| 2003/0163242 | A1 | * | 8/2003 | Miyauchi | F02D 41/1498 701/111 |
| 2008/0229806 | A1 | * | 9/2008 | Cubr | G01L 23/225 73/35.03 |

(Continued)

Primary Examiner — Carl C Staubach
(74) Attorney, Agent, or Firm — Julia Voutyras; McCoy Russell LLP (57) ABSTRACT

Methods and systems are provided for engine misfire detection. In one example, a method may include sampling crankshaft fluctuations with a first and a second sampling window, wherein the first and second windows overlapping each other; and identify misfire based on the sampled signals. The method may further comprise adjusting engine operation responsive to the misfire indication via a control unit.

18 Claims, 6 Drawing Sheets

(56) References Cited

U.S. PATENT DOCUMENTS

| | | | |
|---|---|---|---|
| 2011/0139118 A1* | 6/2011 | Glugla | F02D 35/027 123/406.29 |
| 2015/0128683 A1* | 5/2015 | Kumano | F02D 35/026 73/35.08 |
| 2015/0159573 A1* | 6/2015 | Glugla | F02D 41/1498 701/103 |

* cited by examiner

MISFIRE DETECTION WITH CRANKSHAFT VIBRATIONS

FIELD

The present description relates generally to methods and systems for misfire detection and actions responsive to misfire detection in an internal combustion engine.

BACKGROUND

Engine control systems may include misfire detection modules for identifying combustion events that occur outside of a base ignition timing. As an example, engine misfire can be identified by detecting the fluctuations in the crankshaft torsional vibration. These crankshaft torsional vibrations include the torsional fluctuations in the crankshaft rotation around the mean crankshaft speed.

One example approach is shown by Stander in U.S. Pat. No. 5,633,456. Therein, crankshaft rotation is sampled for a predefined angular displacement for each expected cylinder firing. Misfire signals are then identified by applying filters in the frequency domain.

SUMMARY

In one example, the issues described above may be addressed by a method of generating a first cylinder misfire indication based on crankshaft fluctuations sampled over a first window; and generating a second, different, cylinder misfire indication based on crankshaft fluctuations sampled over a second window, the first and second windows overlapping each other.

For example, crankshaft vibrations may be monitored by a crankshaft positioning sensor coupled to a crankshaft in an internal combustion engine. A control unit may sample the crankshaft rotation over a first sampling window and then a second sampling window that overlaps with the first sampling window. The engine may perform a first combustion event within the first sampling window and a second combustion event within the second sampling window, wherein the second combustion event follows immediately after the first combustion event. The control unit may then indicate misfire during the engine combustion operation based on the sampled signals.

In this way, misfire can be robustly identified under operating conditions including medium to low engine load and moderate to high engine speeds. Moreover, the misfire detection method is less sensitive to the location of the sensor. For example, by sampling crankshaft fluctuations with overlapping sampling windows, the signal content at full engine orders may be significantly reduced. Namely, the overlapping sampling may selectively include torsional vibrations due to combustion and combustion misfire, while selectively reducing inclusion of vibration due to the piston and connecting rod reciprocating inertia.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
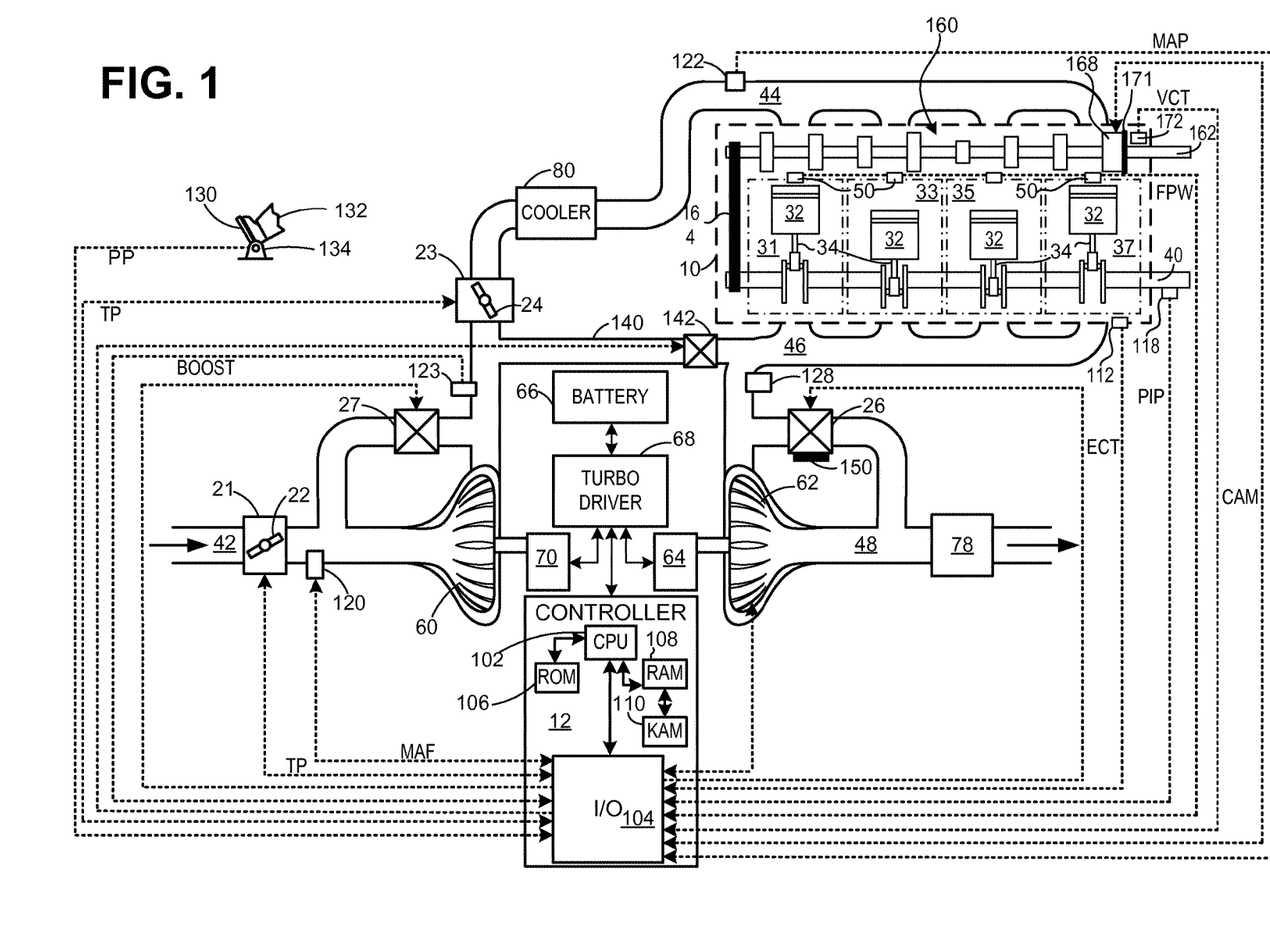
FIG. 1 shows a block diagram of a turbocharged engine including a crankshaft.
Figure 2:
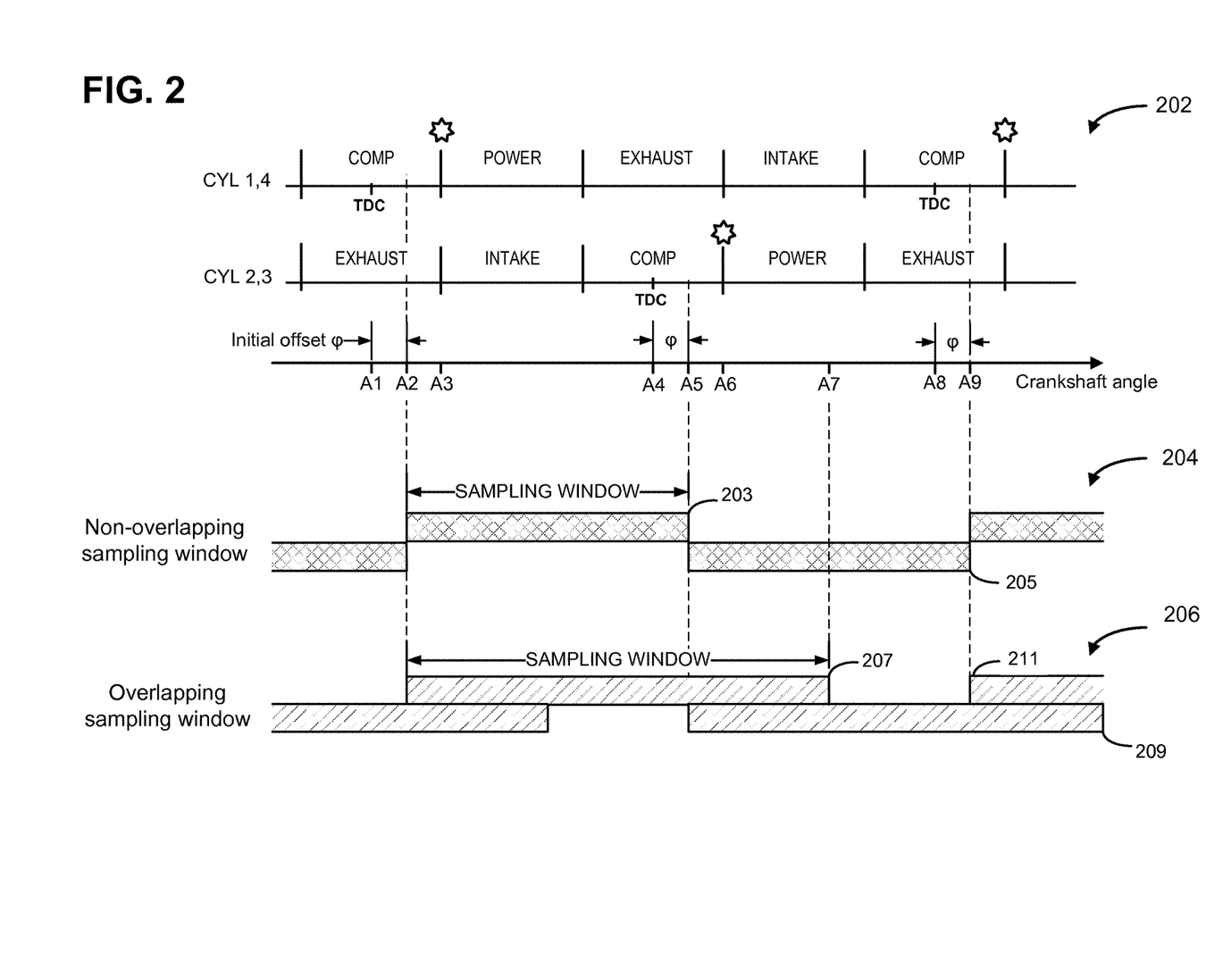
FIG. 2 demonstrates two schemes for sampling crankshaft rotation.
Figure 3:
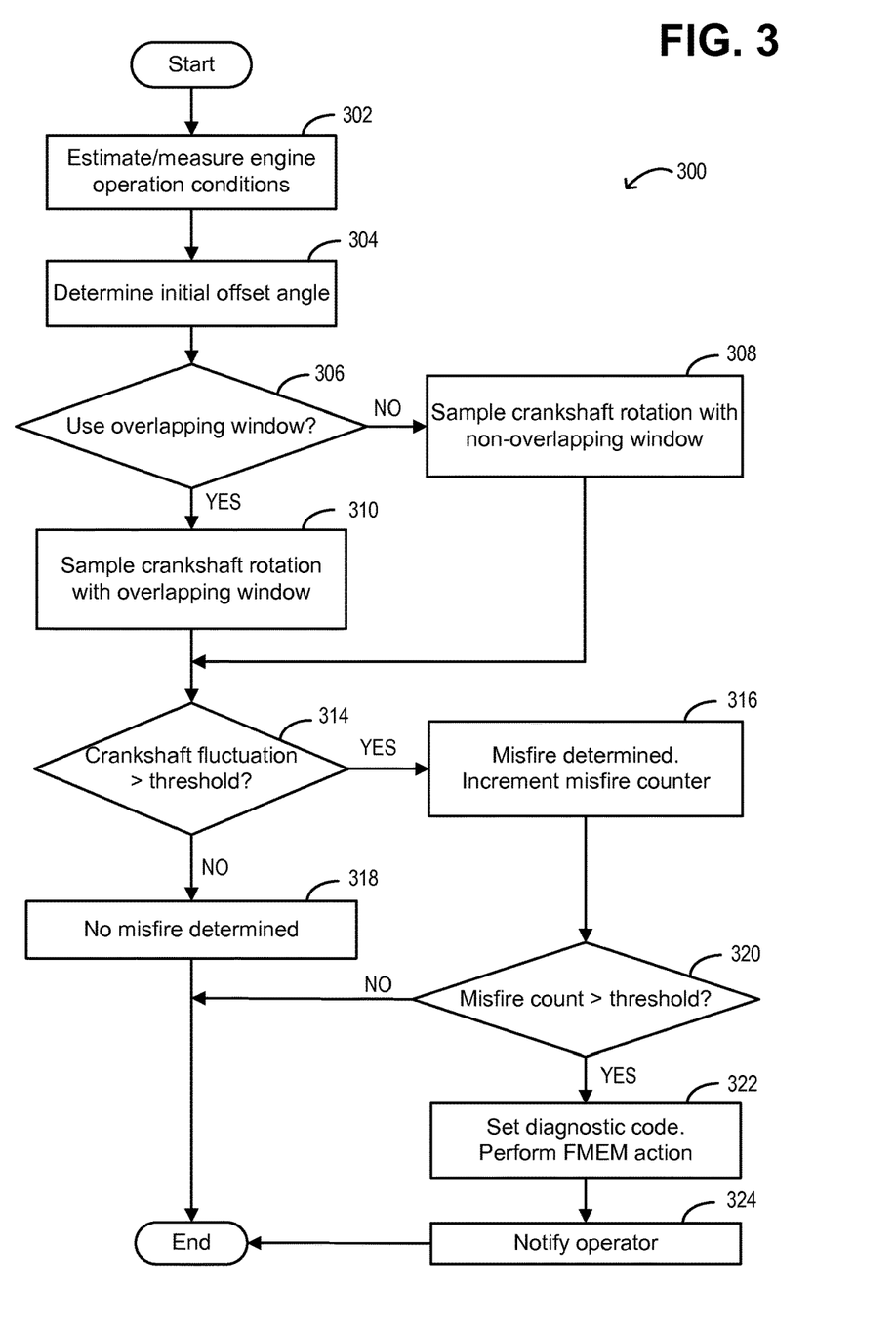
FIG. 3 shows a flow chart of an example of a method to detect engine misfire based on crankshaft fluctuations and to adjust engine operating conditions responsive to the detection.
Figure 4:
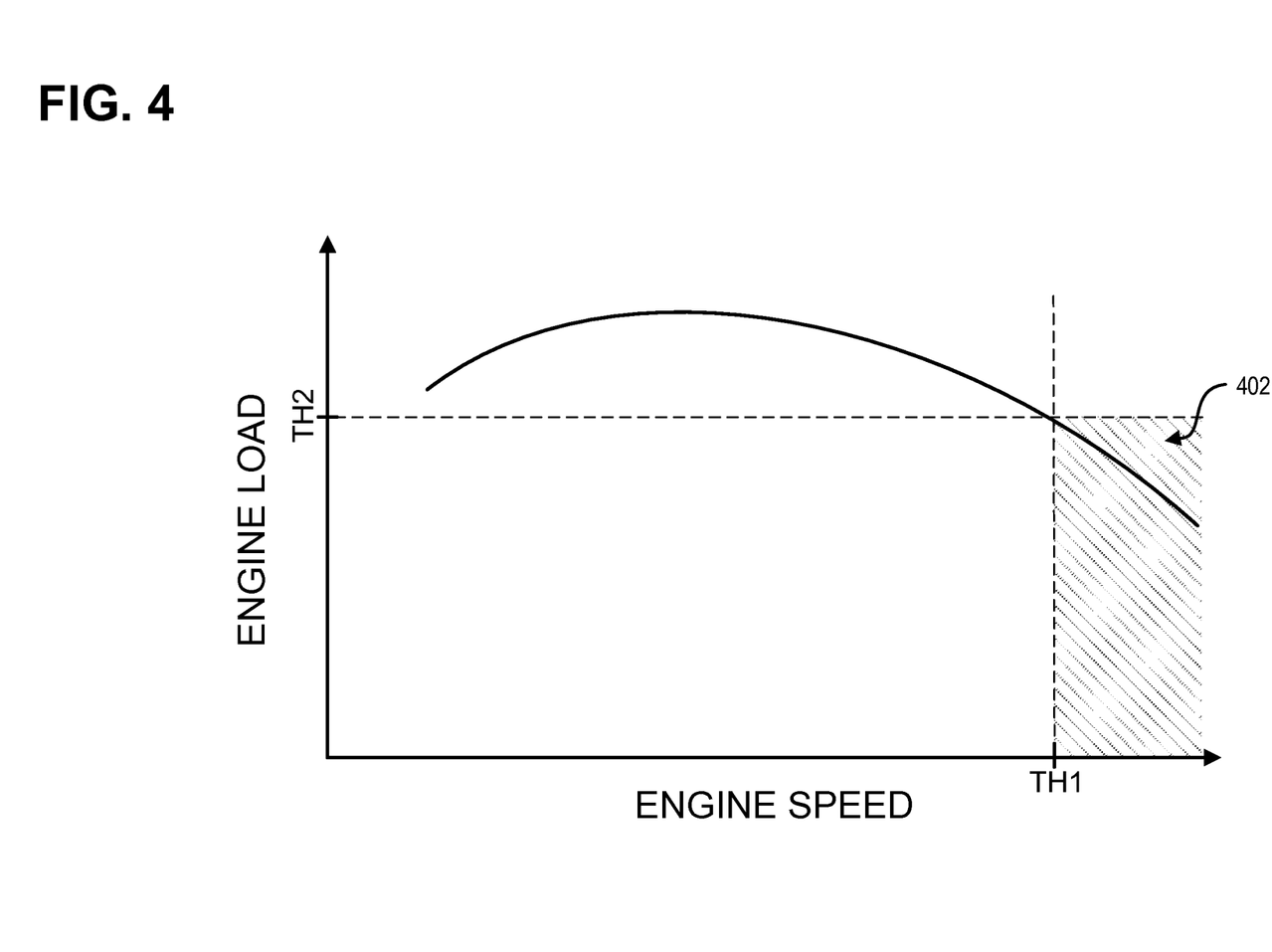
FIG. 4 shows example relationship between engine speed and engine load.
Figure 5A:
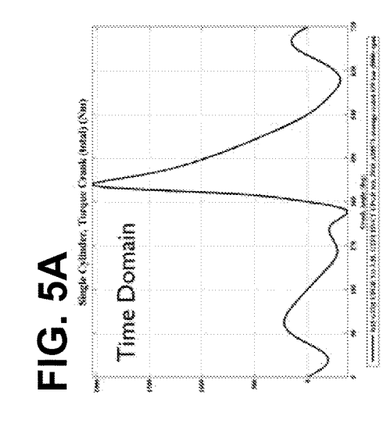
FIGS. 5A-5D demonstrate frequency components of crankshaft torsional vibrations.
Figure 5B:
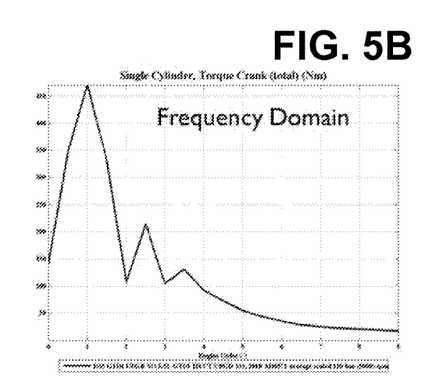
Figure 5C:
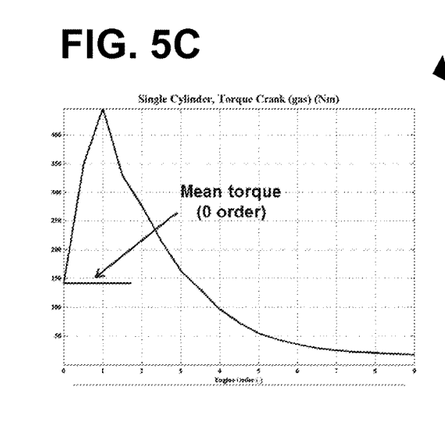
Figure 5D:
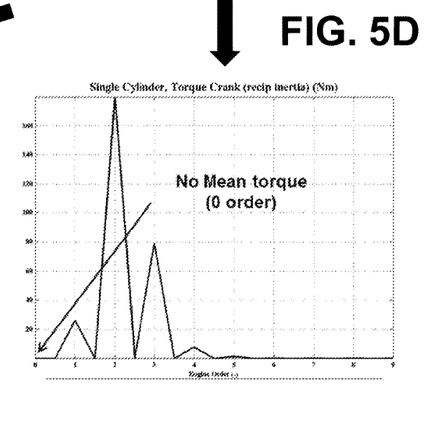
Figure 6A:
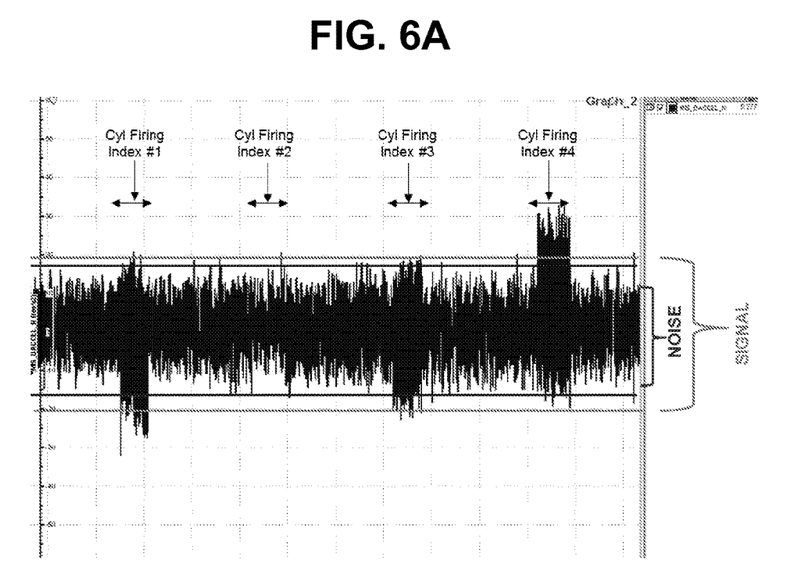
FIGS. 6A-6B show improved misfire detection with an example of the disclosed method.
Figure 6B:
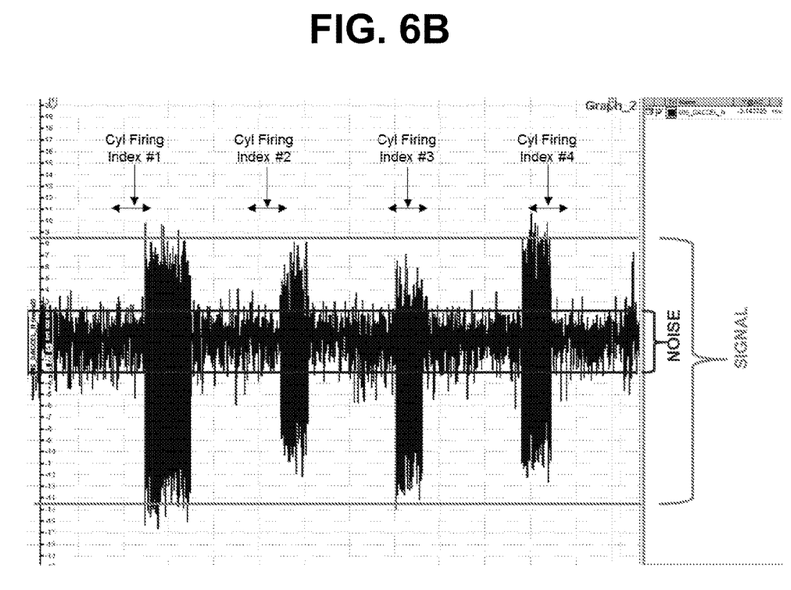

The following description relates to systems and methods for detecting misfire in an internal combustion engine based on crankshaft fluctuations, and adjusting engine operation in response thereto. FIG. 1 shows a block diagram of an internal combustion engine including a crankshaft. Rotation of the crankshaft during engine operation can be sampled synchronously with crankshaft angle. FIG. 2 demonstrates two sampling schemes using non-overlapping and overlapping sampling windows for a four cylinder engine. FIG. 3 summarizes an example of a misfire detection method based on the sampling schemes shown in FIG. 2. FIG. 4 demonstrates the relationship between engine load and engine speed. FIGS. 5A-5D show frequency components of crankshaft torsional vibrations. FIGS. 6A-6B show improved misfire detection achieved with an example of the disclosed method.

As described herein, crankshaft torsional vibrations of an engine crankshaft are driven by both engine combustion and the inertial loading due to piston and connecting rod reciprocating motion. During medium to low engine load and moderate to high engine speeds, torsional vibrations due to normal engine torsional vibration can be stronger than the torsional vibrations due to combustion. The normal engine torsional vibration may be further amplified due to crankshaft flexibility (considering that the cranktrain system includes a rigid body torsional vibration mode when all parts of the crankshaft vibrate equally and a flexible mode when individual component of the crankshaft vibrates differently). The crankshaft torsional vibrations can be more sensitive to flexible vibration modes when the sensor is positioned further away from the location of zero deflection of the crankshaft. For example, the torsional vibrations may be stronger when the sensor is positioned at the front of the crankshaft than close to the flywheel.

Frequency components of the crankshaft torsional vibrations contain half engine orders depending only on combustion, and full engine orders depending on both combustion torque and inertia torque. By sampling crankshaft fluctuations over overlapping sampling windows with a window duration larger than a total number of crankshaft degrees between immediately adjacent cylinder top dead centers of compression, the signal at full engine orders may be significantly reduced. For example, the overlapping sampling may selectively include torsional vibrations due to combustion and combustion misfire, while reducing inclusion of vibration due to the piston and connecting rod reciprocating inertia. Therefore, engine misfires may be more robustly identified especially during medium to low engine load and moderate to high engine speeds. Further, because sampling with overlapping windows is less sensitive to normal cranktrain torsional vibrations, it may be possible to operate with the crankshaft positioning sensor located at any position along the crankshaft/damper/flywheel assembly.

FIG. 1 is a schematic diagram showing an example engine 10, which may be included in a propulsion system of an automobile. The engine 10 is shown with four cylinders 31, 33, 35, and 37. However, other numbers of cylinders may be used in accordance with the current disclosure. Engine 10 may be controlled at least partially by a control system including control unit 12, and by input from a vehicle operator 132 via an input device 130. In this example, input device 130 includes an accelerator pedal and a pedal position sensor 134 for generating a proportional pedal position signal PP.

Each combustion chamber (e.g., cylinder) 31, 33, 35, and 37 of engine 10 may include combustion chamber walls with a piston 32 positioned therein. The pistons may be coupled to a crankshaft 40 through a connecting rod 34 so that reciprocating motion of the piston is translated into rotational motion of the crankshaft. A crankshaft positioning sensor 118 coupled to crankshaft 40 can sense the rotation of the crankshaft and transfer the rotation signal to control unit 12. The crankshaft positioning sensor 118 may be a high data rate wheel crankshaft positioning sensor. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 31, 33, 35 and 37 may receive intake air from intake manifold 44 via intake passage 42 and may exhaust combustion gases via exhaust passage 48. Intake manifold 44 and exhaust manifold 46 can selectively communicate with combustion chambers 31, 33, 35, and 37 via respective intake valves and exhaust valves (not shown). In some embodiments, combustion chambers 31, 33, 35, and 37 may include two or more intake valves and/or two or more exhaust valves. The intake and/or exhaust valves may be actuated (e.g., opened and closed) via respective cams 160 disposed on a camshaft 162 as the camshaft undergoes rotational motion.

Fuel injectors 50 are shown coupled directly to combustion chambers 31, 33, 35, and 37 for injecting fuel directly therein in proportion to the pulse width of signal FPW received from control unit 12. In this manner, fuel injector 50 provides what is known as direct injection of fuel into combustion chambers 31, 33, 35, and 37. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 31, 33, 35, and 37 may alternatively, or additionally, include a fuel injector arranged in intake manifold 44 in a configuration that provides what is known as direct injection of fuel into the intake port upstream from each combustion chambers 31, 33, 35, and 37.

Control unit 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 109, and a data bus. The control unit 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; in some examples, a profile ignition pickup signal (PIP) from crankshaft positioning sensor 118; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof.

Now turning to FIG. 2, example sampling schemes for crankshaft rotation is demonstrated in a four cylinder engine. The crankshaft rotation may be sensed by a crankshaft position sensor 118 coupled to a crankshaft 40. The crankshaft rotation may be sampled by control unit 12 synchronously with crankshaft angle. An example of the top dead centers (TDCs) of compression and engine firing corresponding to the crankshaft angle for engine 10 is shown in 202. Ignition and the corresponding combustion event within a cylinder are represented by a star symbol. At crankshaft angle A1, pistons in cylinders 1 and 4 reach TDC of compression. Cylinders 1 and/or 4 fire at crankshaft angle A3. Pistons in cylinders 2 and 3 are subsequently driven to TDC of compression at crankshaft angle A4. As an example, the duration between crankshaft angle A1 and A4 may be 180 degrees. Following the combustions in cylinders 1 and/or 4 at A3, cylinders 2 and/or 3 fire at crankshaft angle A6, and pistons in cylinders 1 and 4 are driven back to the TDC of compression at A8. The sampling schemes with non-overlapping and overlapping windows are shown in 204 and 206 respectively. Details of the two sampling schemes and the condition under which they are applied are further explained in the following sections.

Turning to FIG. 3, routine 300 depicts an example of a method to detect engine misfire based on fluctuations of a crankshaft and to operate the engine in response to the detection. The method may enable robust detection of misfire under various engine operating conditions.

At 302, the method includes estimating and/or inferring engine operating conditions. These may include, for example, engine speed, engine temperature, catalyst temperature, boost level, MAP, MAF, ambient conditions (temperature, pressure, humidity, etc.).

At 304, an initial offset of crankshaft angle is determined based on the engine operating conditions determined at 302. The initial offset angle is the duration of crankshaft angles from TDC of compression to the start of a sampling window within the same compression stroke of a cylinder. An example of the initial offset angle $\varphi$ is demonstrated in FIG. 2. Pistons in cylinders 1 and 4 reach TDC of compression at crankshaft angle A1. Combustions in cylinders 1 and/or 4 then occur at A3. In 204, non-overlapping sampling window 203 starts at A2. The initial offset angle $\varphi$ is the duration between crankshaft angles A1 and A2. The initial offset angle $\varphi$ should be less than the duration between TDC of compression (A1) and the subsequent combustion events (A3) in the same cylinder cycle to ensure that the combustion events at A3 are properly sampled.

At 306, a sampling scheme is determined based on the engine operating conditions estimated in 302. As an example, engine speed and engine load may be compared to pre-determined respective thresholds. If the engine speed is lower than a first threshold and/or the engine load is higher than a second threshold, routine 300 moves to 308, wherein the crankshaft rotations may be sampled with non-overlapping windows as described herein, such as with regard to FIG. 2. If the engine speed is higher than a first threshold and the engine load is lower than a second threshold, routine 300 moves to 310, wherein the crankshaft rotation may be sampled with overlapping windows, such as described in FIG. 2. Note that in one example, the sampling windows define the duration (e.g., crankshaft duration) over which samples for a particular combustion event are taken of crankshaft fluctuation, whereas samples for that same particular combustion event are not taken outside the window. This means that the determination of whether a particular combustion even is or is not a misfire (or is some degree of misfire) is based only on data sampled during the respective window for that combustion event, and not based on crankshaft fluctuation data outside that window.

FIG. 4 demonstrates example relationship between engine load and engine speed in an internal combustion engine. With increased engine speed, the engine load first slightly increases then decreases. During medium to low engine load and moderate to high engine speeds, torsional vibrations due to normal engine torsional vibration may be stronger than the torsional vibrations due to combustion. Therefore, when engine speed is higher than the first threshold TH1 and the engine load lower than the second threshold TH2 (region 402), signal to noise ratio (SNR) of combustion due to misfire may be too low to be robustly identified with the non-overlapping windows 204. Under such condition, the overlapping windows 206 may be used to sample the crankshaft rotation.

At 308, the crankshaft rotation is sampled with non-overlapping windows. An example duration of the sampling window is the total number of crankshaft degrees between immediately adjacent cylinder TDCs of compression. As an example, the length of the sampling window may be determined based on the number of cylinders in engine 10. For a four cylinder engine, the sampling window length may be 180 degrees of crankshaft angle. For an n-cylinder engine, the sampling window length may be 720/n degrees of crankshaft angle.

An example sampling scheme for a four cylinder engine with non-overlapping windows is demonstrated in 204 of FIG. 2. After pistons in cylinders 1 and/or 4 reach TDCs of compression at A1, a first sampling window 203 for cylinders 1 and 4 may start at A2, delayed by the initial offset φ determined at 304. The first sampling window 203 may stop at A5. The duration of the first sampling window may be the total number of crankshaft degrees between A1 and A4. Immediately after the first sampling window 203 stops, a second sampling window 205 may start at A5 to sample the crankshaft rotations for cylinders 2 and 3. The first and second sampling windows (203 and 205) may be of the same length and be fully non-overlapping, meaning in one example each window is only non-overlapping with each and every other sampling window.

At 310, the crankshaft rotation is sampled in a window that at least partially, and in one example only, overlaps with another sampling window. In one example, the duration of the sampling window may be more than the total number of crankshaft degrees between immediately adjacent cylinder TDCs of compression. The total amount of crankshaft angle overlap between the sampling windows may be approximately one third of the duration of the window, plus or minus one to ten samples, for example. As an example, the duration of the sampling window may be determined based on the number of cylinders in engine 10. For a four cylinder engine, the sampling window duration may be approximately 270 degrees of crankshaft angle. For an n-cylinder engine, the sampling window duration may be 1080/n degrees of crankshaft angle.

An example sampling scheme with only partially overlapping windows for a four cylinder engine is shown in 206 of FIG. 2. After TDC of compression of cylinders 1 and/or 4, a first sampling window 207 for cylinders 1 and 4 may start at A2 after delaying by the initial offset φ determined at 304. The first sampling window 207 may stop at A7. Cylinders 1 and/or 4 reach TDC of compression again at A8. There is only one TDC of compression A4 between A1 and A8. The duration of the first sampling window 207 may be more than a total number of crankshaft degrees between immediately adjacent cylinder TDCs of compression (A1 from A4). Additionally, this duration may be less than a threshold, such as less than a total number of crankshaft degrees between two non-adjacent cylinder top dead centers, or less than a total number of crankshaft degrees between two cylinder top dead centers separated by a cylinder firing therebetween. The duration of the first sampling window 207 may be 1.5 times of the duration from A1 to A4, for example. After delaying by the initial offset φ from the TDC of compression of cylinders 2 and 3 at A4, a second sampling window 209 may start at A5 to sample the crankshaft rotation of cylinders 2 and 3. A third sampling window 211 may start at A9 after a delay of the initial offset φ from A8 to sample the crankshaft rotations of cylinders 1 and 4. In one example, durations of the sampling windows are equal. In this example, sampling windows may be partially overlapping over a range of crankshaft angles, and non-overlapping over the rest of the crankshaft angles. Durations of the partial overlapping and non-overlapping crankshaft angles may be approximately one third of the total durations of the sampling window. For example, in 206, crankshaft angles from A5 to A7 may be partially overlapped by windows 207 and 209, while crankshaft angles from A7 and A9 may only be sampled by window 209. At 314, routine 300 compares the crankshaft fluctuations to a threshold. If the fluctuation is higher than the threshold, misfire is determined and routine 300 moves on to 316. If the fluctuation is lower than the threshold, routine 300 moves to 318 and indicates that no misfire is detected.

In one example, the crankshaft fluctuations may be calculated based on the crankshaft rotation within a sampling window. The mean crankshaft speed within the sampling window may be calculated first. Specifically, crankshaft rotation speed at each sampling point may be summed and divided by the number of samples in the sampling window. Then, the mean rotation speed may be subtracted from the crankshaft rotations to get the crankshaft fluctuations due to torsional vibrations. In another example, SNR (signal to noise ratio) of the crankshaft fluctuations may be compared to a pre-determined threshold. The pre-determined threshold may be 2:1, i.e. amplitude of the crankshaft fluctuation is twice of the noise level.

At 316, in response to the determination of misfire, a misfire counter may be incremented. In one example, the misfire counter may be included in the control unit's memory and may reflect a number of cylinder misfire events that have occurred.

At 320, it may be determined if a misfire count of the misfire counter is higher than a threshold number. In one example, it may be determined if a threshold number of cylinder misfire events have occurred. Additionally, it may be determined if a threshold number of cylinder misfire events have occurred over a duration or distance of vehicle travel, or over a given drive cycle. If the threshold count has been exceeded, then at 322, a diagnostic code may be set, a mitigating action may be performed. Finally a misfire event may be displayed to the operator at 324. For example, in response to occurrence of a threshold number of cylinder misfire events, the engine may be operated in an FMEM mode. Therein, one or more mitigating actions may be performed including operating the (affected) cylinder richer than stoichiometry (e.g., operating the cylinder rich for a duration), limiting engine airflow (e.g., limiting engine airflow for a duration), limiting a total amount of turbocharger boost level, and reducing an amount of EGR.

As another example, in response to the indication, fuel injection parameters may be adjusted. For example, the indication of misfire may be received during a first cylinder combustion event, and based on the indication of misfire, the controller may adjust fuel injection to an engine cylinder during a second, subsequent (e.g., immediately subsequent) cylinder combustion event. The adjusting may include advancing the fuel injection and optionally performing more vaporization heating with a fuel heater on a cold engine. In some embodiments, other combustion parameters may be adjusted responsive to the indication of misfire.

An example advantage of the disclosed method is further explained in FIG. 5, which illustrates analysis and processing of the frequency components in crankshaft fluctuations. FIG. 5A shows the torque acting on a crankshaft in the crankshaft angle domain. The time varying torque has a frequency content that is represented by engine orders as shown in FIG. 5B. The torque that causes the crankshaft torsional vibrations includes combustion torque and piston/connecting rod inertia torque. Frequency components due to the combustion torque are shown in FIG. 5C. Because the combustion event for each cylinder repeats every 2 crankshaft revolutions, the combustion torque has a full order content including full engine orders (1, 2, 3, etc.) as well as half engine orders (0.5, 1.5, 2.5, etc.). The magnitude of the combustion torque at each engine order depends on engine load. The frequency component due to the piston/connecting rod reciprocating masses inertia is shown in FIG. 5D. Because the piston dynamics repeats with each crankshaft revolution, the piston/connection rod inertia torque has only full order content (1, 2, 3, etc.) but no half engine order content. The inertia torque magnitude depends on engine speed but not engine load. Therefore, if the engine operates at medium to low engine load and moderate to high engine speeds, the SNR for crankshaft torsional vibration decreases due to decreased combustion torque and increased piston/connecting rod inertia torque. Under these engine operating conditions, the crankshaft torsional vibrations due to misfire may be hard to distinguish.

The combined torque order content (FIG. 5B) is a summation of the combustion torque and the inertia torque with appropriate magnitudes and phase. The half-orders depend only on combustion and the full orders depend on combustion torque and inertia torque. This is the main reason why non-overlapping crankshaft angle sampling is utilized under medium to low engine load and moderate to high engine speeds. The overlapping sampling windows operate to selectively include harmonics that correspond to the combustion excitation (half orders) but not the harmonics due to combustion and the inertial excitation (full orders). By utilizing different sampling schemes based on engine load and engine speed, current misfire detection method may operate robustly at all engine conditions.

FIG. 6 demonstrates an improved SNR with overlapping sampling windows during medium to low engine load and moderate to high engine speeds. Engine misfire is introduced to each individual cylinder of an I4 gasoline direct injection engine. FIG. 6A shows crankshaft fluctuations generated by sampling crankshaft rotations with non-overlapped sampling windows demonstrated in 204 of FIG. 2. The misfire signal is difficult to identify due to the low SNR of the crankshaft fluctuations. FIG. 6B shows crankshaft fluctuations generated by sampling the crankshaft rotations with overlapping windows demonstrated in 206 of FIG. 2. The SNR of crankshaft fluctuations due to misfire is significantly increased, and the noise level is decreased. Therefore, engine misfires may be more easily identified by analyzing the SNR of crankshaft fluctuations.

In this way, by sampling crankshaft fluctuations with overlapping windows during medium to low engine load and moderate to high engine speeds, and sampling the crankshaft fluctuations with non-overlapping windows in other engine conditions, it is possible to selectively sample the crankshaft torsional vibrations in a way that is more sensitive to the combustion torque and less sensitive to the inertia torque. Thus, the signal noise ratio of the crankshaft fluctuations due to misfire is improved over all engine conditions, and engine misfires can be robustly identified. Moreover, by taking advantage of overlapping sampling windows, reduced sensitivity to the location of the sensor measuring the crankshaft fluctuations is achieved, increasing flexibility of the engine system design.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

In one example, a method for an engine may comprise performing combustion in a first cylinder, followed by combustion in a second cylinder; monitoring crankshaft fluctuations during an engine operation; sampling the crankshaft fluctuations with a first sampling window and a second sampling window, wherein the first and the second sampling windows each includes at least a combustion event in the engine firing order, and the first and second sampling windows overlap with each other; and displaying misfire to an operator of the vehicle based on the sampled crankshaft fluctuations. The first window may overlap the second window by approximately one third of a duration of one of the first and second windows. Further in combination with any of the previous elements of this paragraph, the crankshaft angle durations of the first and second windows may be approximately equal, wherein a total amount of crankshaft angle overlap between the first and second windows is approximately one third of the equal durations. Further in combination with any of the previous elements of this paragraph, the display is performed by a control unit of the vehicle during vehicle operation, wherein the crankshaft fluctuations are sampled synchronously with crankshaft angle. Further in combination with any of the previous elements of this paragraph the first window is more than a total number of crankshaft degrees between immediately adjacent cylinder top dead centers of compression, but less than a total number of crankshaft degrees between two non-adjacent cylinder top dead centers of compression. Further in combination with any of the previous elements of this paragraph, the two non-adjacent cylinder top dead centers are separated by only one other cylinder top dead center, the method further comprising, via a control unit, adjusting engine operation responsive to the misfire indication.

In another example, an engine method includes generating a first cylinder misfire indication based on crankshaft fluctuations sampled over a first window; and generating a second, different, cylinder misfire indication based on crankshaft fluctuations sampled over a second window, the first and second windows overlapping each other. In combination with any of the above elements of this paragraph, the method may further comprise performing combustion in the first cylinder, followed by combustion in the second cylinder, wherein the misfire indications are generated during engine combustion operation. In combination with any of the above elements of this paragraph, the first window overlaps the second window by approximately one third of a duration of one of the first and second windows. In combination with any of the above elements of this paragraph, crankshaft angle durations of the first and second windows are approximately equal, and wherein a total amount of crankshaft angle overlap between the first and second windows is approximately one third of the equal durations. In combination with any of the above elements of this paragraph, combustion in the second cylinder follows immediately after combustion in the first cylinder, without any other cylinder having combustion initiated therein between the first and second cylinders. In combination with any of the above elements of this paragraph, the indications of cylinder misfire are displayed to an operator of the vehicle, the indications generated by a control unit of the vehicle during vehicle operation, wherein the crankshaft fluctuations are sampled synchronously with crankshaft angle. In combination with any of the above elements of this paragraph, the first window is more than a total number of crankshaft degrees between immediately adjacent cylinder top dead centers of compression, but less than a total number of crankshaft degrees between two non-adjacent cylinder top dead centers of compression. In combination with any of the above elements of this paragraph, the two non-adjacent cylinder top dead centers are separated by only one other cylinder top dead center, the method further comprising, via a control unit, adjusting engine operation responsive to the misfire indication.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
attempting initiating ignition of a first combustion in a first cylinder;
attempting initiating ignition of a second combustion in a second cylinder after the first combustion;
sampling a crankshaft signal generated by a sensor coupled to a crankshaft of an engine during and within a first sampling window to determine fluctuations of the crankshaft, wherein the first combustion and the second combustion are within the first sampling window;
sampling the crankshaft signal during a second sampling window to determine fluctuations of the crankshaft, wherein the second combustion is within the second sampling window;
generating a signal indicative of a misfire based on the sampled crankshaft signal and based on whether determined fluctuations of the crankshaft are greater than a threshold; and
adjusting engine operation responsive to the misfire indication.

2. The method of claim 1 wherein the first sampling window overlaps the second sampling window by approximately one third of a duration of one of the first and second sampling windows.

3. The method of claim 1 wherein crankshaft angle durations of the first and second sampling windows are approximately equal, and wherein a total amount of crankshaft angle overlap between the first and second sampling windows is approximately one third of the equal durations.

4. The method of claim 1 wherein the second combustion in the second cylinder follows immediately after the first combustion in the first cylinder, without any other cylinder having combustion initiated therein between the first and second combustions.

5. The method of claim 1 wherein the indication of misfire is displayed to an operator of a vehicle, and wherein crankshaft fluctuations are sampled synchronously with crankshaft angle.

6. The method of claim 1 wherein the first sampling window is more than a total number of crankshaft degrees between immediately adjacent cylinder top dead centers of compression, but less than a total number of crankshaft degrees between two non-adjacent cylinder top dead centers of compression.

7. The method of claim 6 wherein the two non-adjacent cylinder top dead centers of compression are separated by only one other cylinder top dead center of compression.

8. A method for an engine, comprising:
attempting initiating ignition of a first combustion in a first cylinder;
attempting initiating ignition of a second combustion in a second cylinder after the first combustion;
sampling a signal generated by a sensor coupled to a crankshaft of the engine during a first sampling window to determine fluctuations of the crankshaft, the first combustion is within the first sampling window, and wherein the first sampling window is more than a total number of crankshaft degrees between immediately adjacent cylinder top dead centers of compression, and less than a total number of crankshaft degrees between two non-adjacent cylinder top dead centers of compression;

sampling the signal during a second sampling window to determine fluctuations of the crankshaft, wherein the second combustion is within the second sampling window, and wherein the second sampling window overlaps with the first sampling window;

generating a signal indicative of a misfire based on the sampled signal and based on whether determined fluctuations of the crankshaft are greater than a threshold; and adjusting engine operation responsive to the misfire indication.

9. The method of claim 8, wherein the signal is crankshaft rotation speed sampled by a crankshaft position sensor.

10. The method of claim 9, further comprising calculating crankshaft fluctuations based on the crankshaft rotation speed.

11. The method of claim 10, further comprising calculating crankshaft fluctuations by subtracting a mean rotation speed from the crankshaft rotation speed.

12. The method of claim 11, further comprising increasing a misfire counter in response to the calculated crankshaft fluctuations higher than the threshold, and displaying the indication of misfire to an operator in response to the misfire counter higher than a threshold.

13. A method for an engine, comprising:
attempting initiating ignition of a first combustion in a first cylinder;
attempting initiating ignition of a second combustion in a second cylinder after the first combustion;
determining lengths of a first sampling window and a second sampling window based on an engine speed and an engine load;
sampling a crankshaft rotation with the first sampling window to determine fluctuations of a crankshaft, the first combustion within the first sampling window;
sampling the crankshaft rotation with the second sampling window to determine fluctuations of the crankshaft, the second combustion within the second sampling window, wherein the first sampling window and the second sampling window overlap if the engine speed is higher than a first threshold and the engine load is lower than a second threshold; and
displaying an indication of misfire to an operator of a vehicle, the indication of misfire based on whether determined fluctuations of the crankshaft are greater than a threshold.

14. The method of claim 13, wherein the first sampling window and the second sampling window do not overlap if the engine speed is lower than the first threshold and the engine load is higher than the second threshold.

15. The method of claim 13, further comprising determining the lengths of the first sampling window and the second sampling window based on a number of cylinders in the engine.

16. The method of claim 1, further comprising determining lengths of the first sampling window and the second sampling window based on an engine speed and an engine load.

17. The method of claim 16, wherein the first sampling window and the second sampling window overlap with the engine speed higher than a first threshold and the engine load lower than a second threshold.

18. The method of claim 16, wherein a length of the first sampling window is $1080/n$ degrees of crankshaft angle for an n-cylinder engine.

* * * * *